United States Patent
Berman

(10) Patent No.: US 6,585,520 B1
(45) Date of Patent: Jul. 1, 2003

(54) METHOD AND SYSTEM FOR ENHANCING MEMORIZATION BY USING A MNEMONIC DISPLAY

(76) Inventor: Dennis R. Berman, 4401 Windsor Ridge Dr., Irving, TX (US) 75083

(*) Notice: Subject to any disclaimer, the term of this patent is extended or adjusted under 35 U.S.C. 154(b) by 0 days.

(21) Appl. No.: 09/923,231

(22) Filed: Aug. 3, 2001

(51) Int. Cl.[7] .............................................. G09B 19/00
(52) U.S. Cl. ...................... 434/236; 434/236; 434/109; 434/108; 434/222; 434/238; 434/368; 434/430
(58) Field of Search ......................................... 434/236

(56) References Cited

U.S. PATENT DOCUMENTS 5,246,375 A * 9/1993 Goede ........................... 283/73
5,511,793 A * 4/1996 Watt .............................. 273/260

FOREIGN PATENT DOCUMENTS

WO     WO 97/18698    * 5/1997

* cited by examiner

Primary Examiner—Henry C. Yuen
Assistant Examiner—Hyder Ali
(74) Attorney, Agent, or Firm—Duane Morris LLP; Howard Chen, Esq.

(57) ABSTRACT

A method and system is disclosed for enhancing a memorization process by using a mnemonic display implemented with a grid learning system. First, the grid learning system is implemented on a predetermined display area of a display device with a plurality of aligned border sections to form the mnemonic display, the border sections containing one or more guiding elements in a predetermined order. When one or more learning entities to be memorized by a user of the mnemonic display are identified, the learning entities are placed in the grid learning system, wherein the first guiding element contained in each learning entity is aligned with a same guiding element in at least one border section, and wherein the locations of the learning entities with reference to the corresponding border sections assist the user to memorize the learning entities.

32 Claims, 7 Drawing Sheets

FIG. 5

Question: What is the last NAME of the CEO you are going to meet for the next meeting?
Answer: Chequiko

FIG. 6

METHOD AND SYSTEM FOR ENHANCING MEMORIZATION BY USING A MNEMONIC DISPLAY

BACKGROUND

This invention relates to a system and method for a memory building process and, more particularly, to a method and system for enhancing keyword memorization by using a mnemonic display.

Learning is a continuing process in life that requires continuous memorization of new concepts, ideas, terms, names, etc. Although a variety of methods have been developed for building a fast and effective memorization process, it is a constant search for finding a better, faster way for enhancing people's memorization process for their daily uses.

In a learning process, although a new theory may be complex, an idea may have to be explained in a long paragraph, but the gist of the theory or the idea may only hinge on a few keywords. Consequently, to learn or to memorize the new concept depends on how well a learner can memorize the keywords.

What is needed, therefore, is a method and system for enhancing keyword memorization by using a mnemonic display.

SUMMARY

A method and system is disclosed for enhancing a memorization process by using a mnemonic display implemented with a grid learning system. First, the grid learning system is implemented on a predetermined display area on a display device with a plurality of aligned border sections, the border sections containing one or more guiding elements in a predetermined order. When one or more learning entities to be memorized by a user of the mnemonic display are identified, the learning entities are placed in the grid learning system, wherein a first guiding element contained in each learning entity is aligned with a same guiding element in at least one border section, and wherein the locations of the learning entities with reference to the corresponding border sections assist the user to memorize the learning entities.

In one example, a method and system is disclosed for enhancing a memorization process by using a mnemonic display implemented with a grid learning system. The grid learning system is implemented on a predetermined display area on a display device with a plurality of aligned border sections, each border section containing one or more alphabets in a predetermined order. After identifying at least one keyword to be memorized by a user of the mnemonic display, one or more syllables of the keyword are placed in the grid learning system, wherein the first alphabet of each syllable is aligned with a same alphabet in at least one border section, and wherein the locations of the syllables with reference to the corresponding border sections assist the user to memorize the keyword.

Since display screens of various computing devices are predominantly the interfaces that a user acquires information from, using a mnemonic display resembling the shape of the display screens of various computing devices can easily establish the grid learning system in the mind of the user. With the grid learning system ingrained in the user's mind, the placements of learning entities such as keywords in the mnemonic display and the relative locations of the placed learning entities with reference to the grid learning system on the mnemonic display can assist the user to remember or recall the learning entities to be remembered.

BRIEF DESCRIPTION OF THE DRAWINGS

FIG. 5 illustrates another configuration of a mnemonic display according to one example of the present invention.

FIG. 6 illustrates a mnemonic display configured with both a first grid learning system of alphabets and a second grid learning system of numerals.

DETAILED DESCRIPTION

The present invention is described below for a method and system for enhancing a memorization process by using a mnemonic display to remember and recall learning entities. As an example, the invention is explained in the context of memorizing English terms or numbers. It is understood that the invention is equally applicable for memorizing any learning entities such as keywords of any other kinds, symbols, sentences, or even graphics, and is applicable for any other languages as well. Moreover, for explanation purposes, the present invention is described below in one or more specific examples with regard to memorizing keywords (as learning entities), and the term "keywords" is understood to include any terms, words, names, and numbers.

In the recent years, with the advancement of computer technologies, computers are more accessible than ever. People use their personal computers (PCs) for various learning and communication purposes. Companies routinely provide computers to their employees for business purposes. Most noticeably, in all learning institutions such as grade schools, vocational schools, colleges, graduate schools, computers are an integrated part of the learning process. More and more training programs have been developed for various objectives to train users or students automatically by using computers. In other words, the computers have become the most important and most frequently used learning and working tools for trainees, professionals, or students. And as it is well understood, user interactions are conducted and shown on computer display screens. Consequently, for people who work, study, or otherwise use computers, the computer display screens have become the object that they set their eyes on for many awaking hours during the day. The present invention takes advantage of this fact and implements a method and system for enhancing the memorization process by using the computer display itself as a memory aid.

Figure 1:
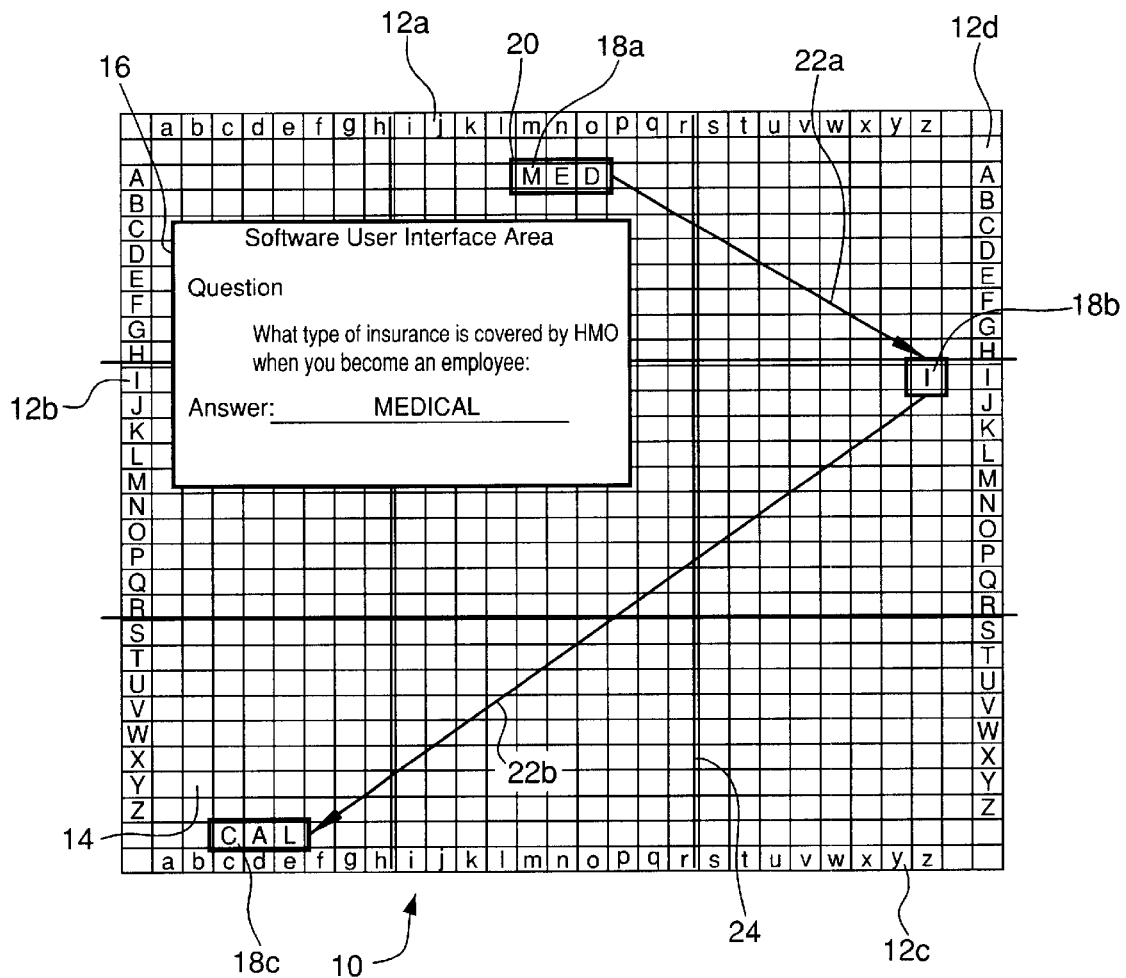
FIG. 1 illustrates a mnemonic display with a grid learning system implemented therein according to one example of the present invention.

FIG. 1 illustrates a mnemonic display with a grid learning system 10 implemented therein according to one example of the present invention. For the purposes of this invention, a term "mnemonic display" is used to refer to all kinds of user interface display areas or display devices such as a PC monitor, television screen, movie screen, network client terminal, display area on a handheld personal data assistant (PDA) or Internet appliance that is implemented with a grid learning system. Although preferred, the mnemonic display does not need to occupy the full display area of a display device, and it can be a "carve-out" display area of the display device. Also, the shape of the mnemonic display is preferred to be the same as the display device, but is not required to be so, especially if a user feels more comfortable working with a mnemonic display of a familiar shape instead of an unfamiliar design of the display device that he or she is presented. It is further understood that since the shape of a mnemonic display may vary, the number of border sections can increase or decrease to fit the mnemonic display as required.

The grid learning system 10 has four border sections (12*a–d*) enclosing a display area 14. The top border 12*a* has alphabets a–z aligned in a predetermined manner so that they are spaced appropriately. The left, right, and bottom borders 12*b–d* have a similar alphabet structure as the top boarder section such that they collectively construct a "grid learning system" enclosed therein. Although the interconnected lines that construct the grid learning system 10 are shown, they can be programmed as watermarks in the background, which are barely visible to a user of such a mnemonic display, and not intrusive for the normal use of the display area. A user interface area 16 is further carved out from the display area 14 for displaying a predetermined user interactive information. For example, as shown, the user interface area 16 provides a question for the user to answer, and the user is required to type in the answer on the answer line.

After the user has finished typing the correct answer, the term "medical" in this example, the term "medical" is dissected into its contained syllables. As it is known, words are made up of one or more "basic elements" such as syllables, and if a user recognizes the separate syllables of a particular word, it would be easier for him to read, write, and most importantly, to remember. In this example, the word "medical" has three syllables (i.e., "med", "i" and "cal"). The first syllable 18*a* is aligned with the top border 12*a,* thereby starting at a location close to the alphabet "m." Similarly, "i" (18*b*) is displayed next to "I" of the right border 12*d,* and finally, "cal" (18*c*) is aligned with "c" on the bottom border 12*c*. Each displayed syllable is presented in a very visible way by altering its font, size, or color to distinguish its location in the grid learning system. Other methods to identify the locations of the placed syllables can also be used such as announcing first alphabet of each syllable when the syllable is placed. In this case, the alphabets "M," "I," and "C" will be announced sequentially to help the user remember the placed locations with reference to the border sections.

In addition, line frames 20 can also be used for highlighting the locations of the syllables with reference to the alphabets on the corresponding border sections. Therefore, the alphabets on the border sections serves as a guidance for the user to remember the locations of the syllables, consequently the syllables themselves and the whole word. In this sense, the alphabets are the guiding elements. Since the grid learning system is designed and programmed to fit with the borders of the mnemonic display, by remembering the relative location of each syllable on the mnemonic display with reference to the grid learning system, the shape and the borders of the mnemonic display itself therefore serve as the primary guiding references for recalling the keywords. Furthermore, in order to help the user to remember the locations of the basic elements and the connections therebetween, tracking signs such as a track line 22*a* with an arrow head can be drawn from one line frame 20 to another pointing out the general direction for regenerating or pronouncing the word. By following the travel path of these track lines, the user can consciously and subconsciously remember the location of each basic element of the keywords. More importantly, the track lines 22*a–b* form a unique pattern/path, thus helping the user to remember the word itself. The intent is to help the user to remember the placement of the basic elements of a keyword or independent keywords so that the locations thereof can by recalled whenever the user looks at a mnemonic display.

After repetitively using the grid learning system described above, the grid learning system may be ingrained into the user's mind, at any time, she can visualize or recall a virtual mnemonic display in her mind, whether it is small or large, with a corresponding virtual grid learning system to help her to recall or remember the learned learning entities such as keywords. For example, if she is used to a rectangular computer display to be a mnemonic display, and after she has learned a keyword and in order to recall the learned keyword, she can visualize and construct the rectangular computer display in her mind, and then recall the four border sections of the mnemonic display. With this virtual infrastructure in mind as a guidance, she can recall or remember the learned keyword by recalling the locations of each syllable of the keyword, thereby recalling the entire keyword. Therefore, by associating keyword or its syllables with the grid learning system constructed by multiple border sections, it is much easier for the user to remember or recall the learned keyword(s).

As an alternative, instead of constructing an entirely virtual mnemonic display, a user can actually turn to any object that bears the similar shape as the mnemonic display and visualize a grid learning system to be imposed thereon. For instance, a computer user can turn to a window in her room to hypothetically visualize the window to be the computer display, and then recalls the keyword she has learned by recalling the locations of the syllables of the keyword and maybe the "zigzag" pattern of the track lines connecting these syllables. In addition, a computer program can be written to instruct the user to take a step-by-step approach to visualize the mnemonic display, the placed syllables, the pattern of the track lines in order to recall the keyword.

Referring back to FIG. 1, in order to help the user to remember roughly where each syllable locates, the mnemonic display 10 can be further dissected by an overlaying grid guiding system 24. The grid guiding system 24 as shown in FIG. 1 separates the entire mnemonic display into nine (9) sections. This further helps the user to remember where each basic element of a keyword might be. For example, before recalling the syllable "me" being aligned with "m", the user may first recall that it is in the upper middle section. By narrowing down the area in which the syllable most likely resides, it is another great assistance tool for the user to remember and recall the syllables, and consequently the entire keyword. It is understood that the grid guiding system 24 is purely optional and can be used only by those users who believe that such a grid guiding system superimposed onto the grid learning system 10 is helpful to enhance their memorization processes. Furthermore, the grid guiding system 24 itself does not need to be limited to nine sections. A preferred number can be chosen by a learning program or the user to assemble the best combination for a particular user.

It is also understood that the user interface area 16 can be in a fixed location on the mnemonic display, but is more often to be dynamically placed and sized based on the answer expected. For instance, in this immediate case, the user interface area 16 is placed toward the upper left corner of the entire mnemonic display in order to leave more room for the three line frames 20 and two track lines 22a–b to show. Therefore, a learning program (not shown) can inform a display controller program (not shown) about the length of its question to be displayed on the user interface area, and the length of the answer. The display controller program then determines how to break the answer (in the form of a keyword) into multiple basic elements, and identifies expected locations of these basic elements on the mnemonic display based on the predetermined alignment of the basic elements with the four border sections. Once this is done, the placement of the user interface area 16 is carried out to make it most visible to the user, but least interfering with the placements of such basic elements.

Figure 2:
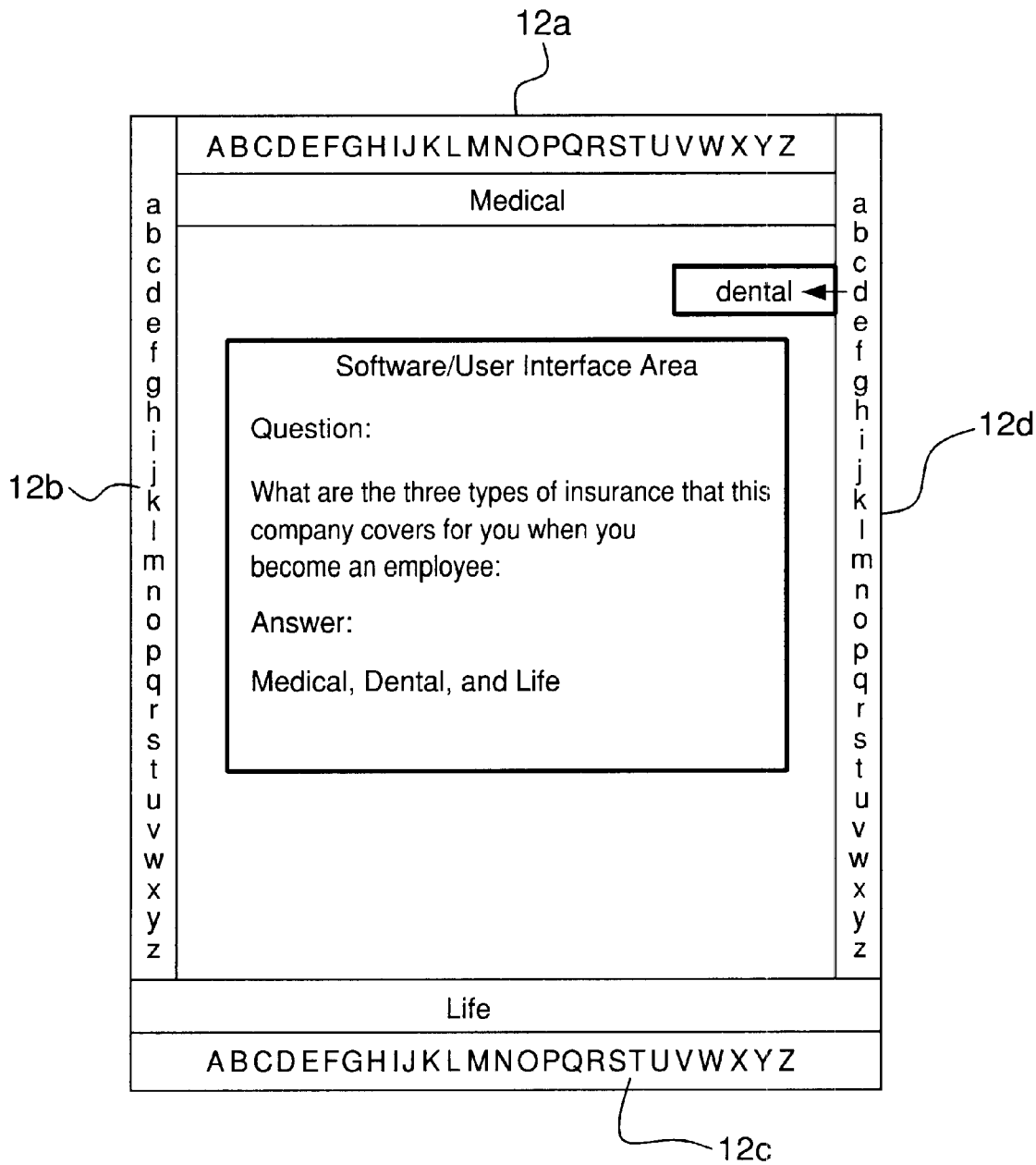
FIG. 2 illustrates a mnemonic display working with a learning program according to another example of the present invention.

FIG. 2 illustrates a mnemonic display working with a learning program according to another example of the present invention. Similar to what is illustrated in FIG. 1, a grid learning system is formed by four border sections 12a–d. As mentioned above, the interconnected lines can be invisible if a display controller program chooses so. The four border sections containing alphabets are aligned to implement the grid learning system 10 so that enough room is created to place a basic element of a keyword or an entire keyword next to any alphabet in each section.

Similar to FIG. 1, a question is presented in the user interface area 16. In this case, the answer to the question includes three keywords, and instead of breaking each keywords into syllables as it is illustrated with regard to FIG. 1, each keyword in this example is shown by aligning with its starting alphabet in one border section. For instance, the keyword "medical" is displayed right below the alphabet "M" of the top border section 12a, the keyword "dental" is aligned with "d" of the right border section 12d, and "life" is put above the alphabet "L" of the bottom border section 12c. Although in this example, the displayed keywords are shown independently, and do not overlap or stay on top of the alphabets in the border section, it is understood that how to display the keyword with regard to the border sections are fully programmable. The display control program presets various display methods, and even let a user to choose the best display method based on his/her personal preference. For instance, when the term "dental" is horizontally aligned with "d" on the right border section, it can be shown on the left side, the right side, or on top of the alphabet "d."

To further indicate the alignment, arrows or other indication signs can be drawn by the display control program between the first alphabet of each keyword to its corresponding alphabet on one of the border sections. Also, as mentioned above, an indication sign may not be a visible sign at all, it may be a sound indication verbally announced by the display control program. Again, the arrows or other indication signs serve the purpose of assisting the user of the mnemonic display to remember the locations of the keywords so that it would be easier to recall these keywords by thinking together with their alignments with the alphabets around the mnemonic display. Consequently, the placement of the each keyword or each basic element of the keyword in the grid learning system defined by an appropriate number of border sections enhances the memorization process significantly.

Figure 3:
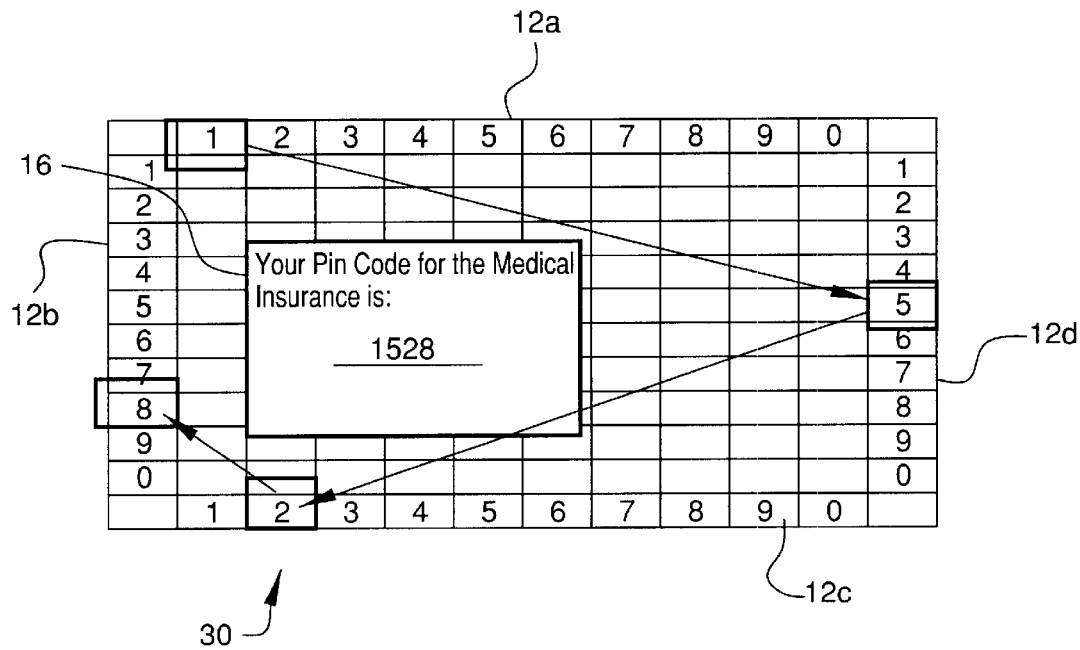
FIG. 3 illustrates a mnemonic display for memorizing numerals according to one example of the present invention.

FIG. 3 illustrates a mnemonic display 30 for memorizing numerals according to one example of the present invention. Like words, numerals are constantly encountered in life, and many of them need to be memorized as well. For example, in a gated community, a resident may have to remember the gate code to enter. The mnemonic display can be configured to help remember the numerals. As shown in FIG. 3, the four border sections 12a–d contain numbers instead of alphabets. Numbers 1 to 0 are placed in predetermined locations, and a user interface area 16 may be used for providing questions to help the user to remember or invoke the user's memory to recall the correct numbers. In this instance, the question asks what is the pin code for the user's residence entrance, and after the user types in "1528" (or showing the number if it is the first time for the user to learn the number), each numeral of the pin code "1528" is placed on the border section and aligned with a corresponding numeral. Similar to what is illustrated in FIG. 1, the placed numerals can be highlighted, boxed by line frames, etc. The sequence of the numerals can be indicated by track lines with arrow heads. Consequently, by using numerals in the border sections of the mnemonic display as guiding posts, it would help the user to remember the number instantly.

Figure 4:
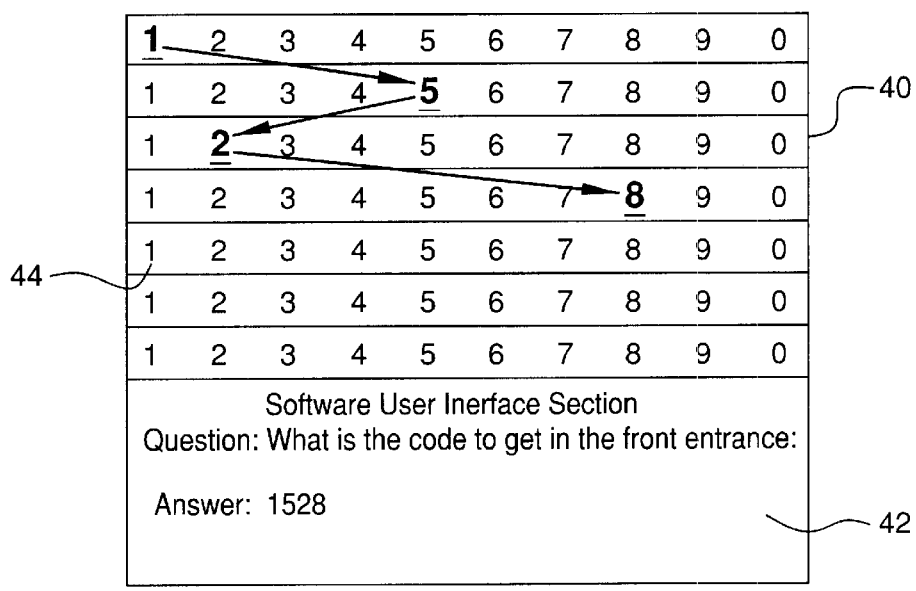
FIG. 4 illustrates another configuration of a mnemonic display for memorizing numerals according to one example of the present invention.

FIG. 4 illustrates another configuration of a mnemonic display 40 for memorizing numerals according to one example of the present invention. Different from what is shown in FIG. 3, in this configuration, the grid learning system 44 is not defined by four border sections, but rather constructed by multiple guiding rows of numerals. However, the shape of the mnemonic display is still rectangular, and still resembles most display screens of computing devices. A user interface area 42 still presents the user with a question or hint expecting an answer to be entered or displayed. The entered or displayed answer is then presented in the grid learning system 44 with each numeral highlighted, boxed, sized, and connected with track lines. Consequently, the "zigzag" pattern of the track lines and the locations of the numerals help the user to remember the number.

FIG. 5 illustrates another configuration of a mnemonic display 50 according to one example of the present invention. This configuration is similar to the configuration of FIG. 4 except that alphabets, instead of numerals, are used to form a grid learning system 52. A user interface area again indicates a keyword to be remembered. The keyword is dissected into syllables, and each is placed in a row of alphabets and aligned with its starting alphabet. In this example, the syllables "CHE", "QUI", AND "KO" are placed over the corresponding rows starting from their corresponding locations (i.e., "C", "Q" and "K"). The syllables are highlighted, sized, boxed, and connected by track lines to form a visual pattern which serves as a memory stimuli for assisting the user to remember or recall the keyword.

FIG. 6 illustrates a mnemonic display 60 configured with both a first grid learning system of alphabets 62 and a second grid learning system of numerals 64. This is a combination of the mnemonic displays as illustrated in FIG. 1 and FIG. 4 to serve the purpose of allowing the user to use one display to memorize both words and numerals. Similarly, various other combinations using different grid learning systems can be made to achieve the same purpose. For instance, the order of the alphabets can be reversed to start from "Z" to "A" instead of vice versa. Or, another numbering system such as Roman numerals can be used instead of Arabic numerals. As long as the principle is to construct a grid learning system on a display area to make it into a mnemonic display, the guiding elements used to define the grid learning system can vary significantly. For instance, a Japanese user may wish to have Japanese alphabets to be the guiding elements of the grid learning system, or to combine such a grid learning system with a second grid learning system using Roman numerals as the guiding elements.

Figure 7:
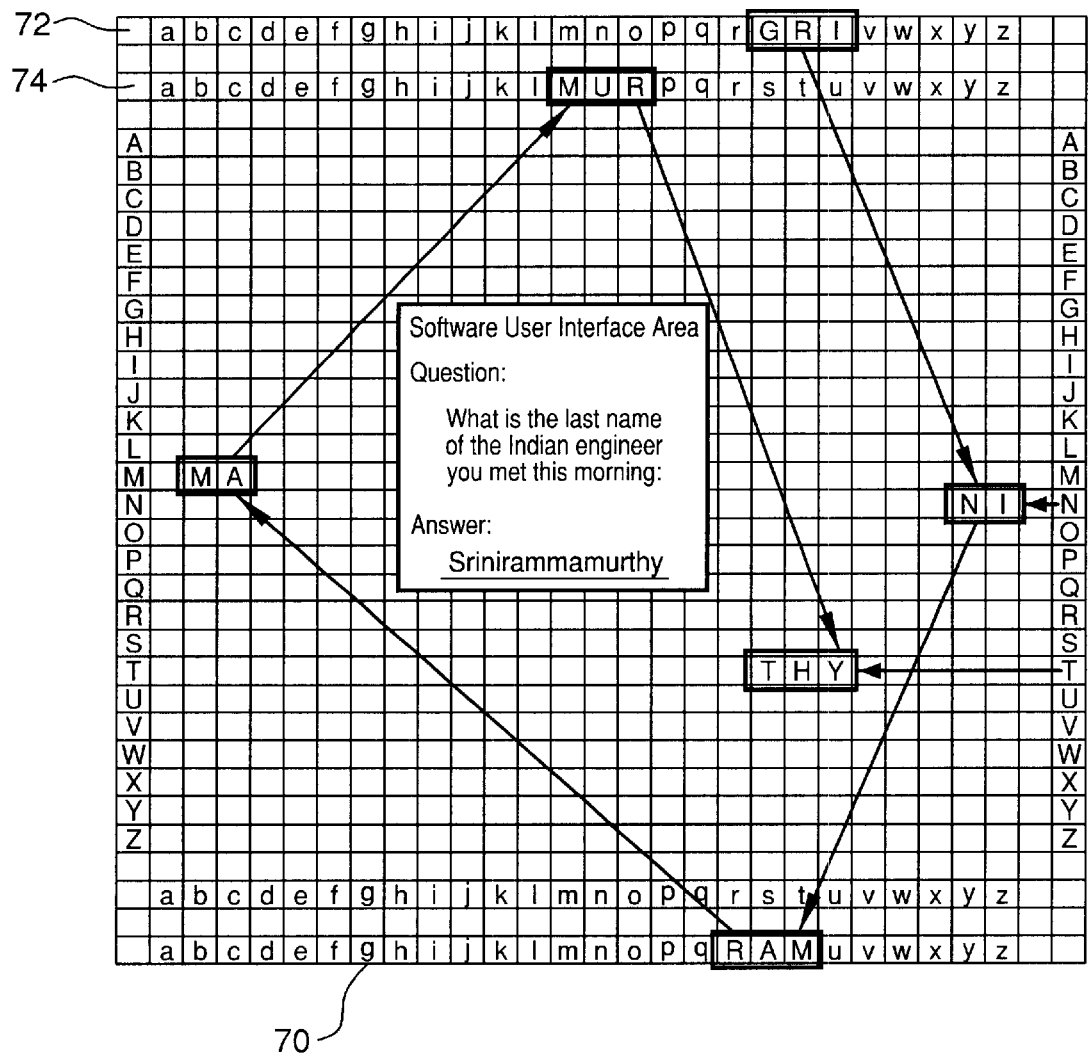
FIG. 7 illustrates another mnemonic display configured to handle a keyword having more than four syllables.

FIG. 7 illustrates another mnemonic display 70 configured to handle a keyword having more than four syllables. Although it is rare in English language that words have more than four syllables, it may be very common for other languages or scientific terms to have long words. The mnemonic display 70 shown in FIG. 7 illustrates one solution to display five or more syllables. Taking the top border section for example, underneath the first row of the alphabets 72, a second row of identical alphabets 74 are installed. The term "Srinirammamurthy" is broken into six (6) syllables, and the first four are placed as described above with regard to FIG. 1. The fifth syllable "MUR" is then placed on the second row 74 instead of the first row 72. Similarly, the sixth syllable "THY" is also placed to be closer to the center of the mnemonic display while still aligned with corresponding alphabet "T" on the right border.

Figure 8:
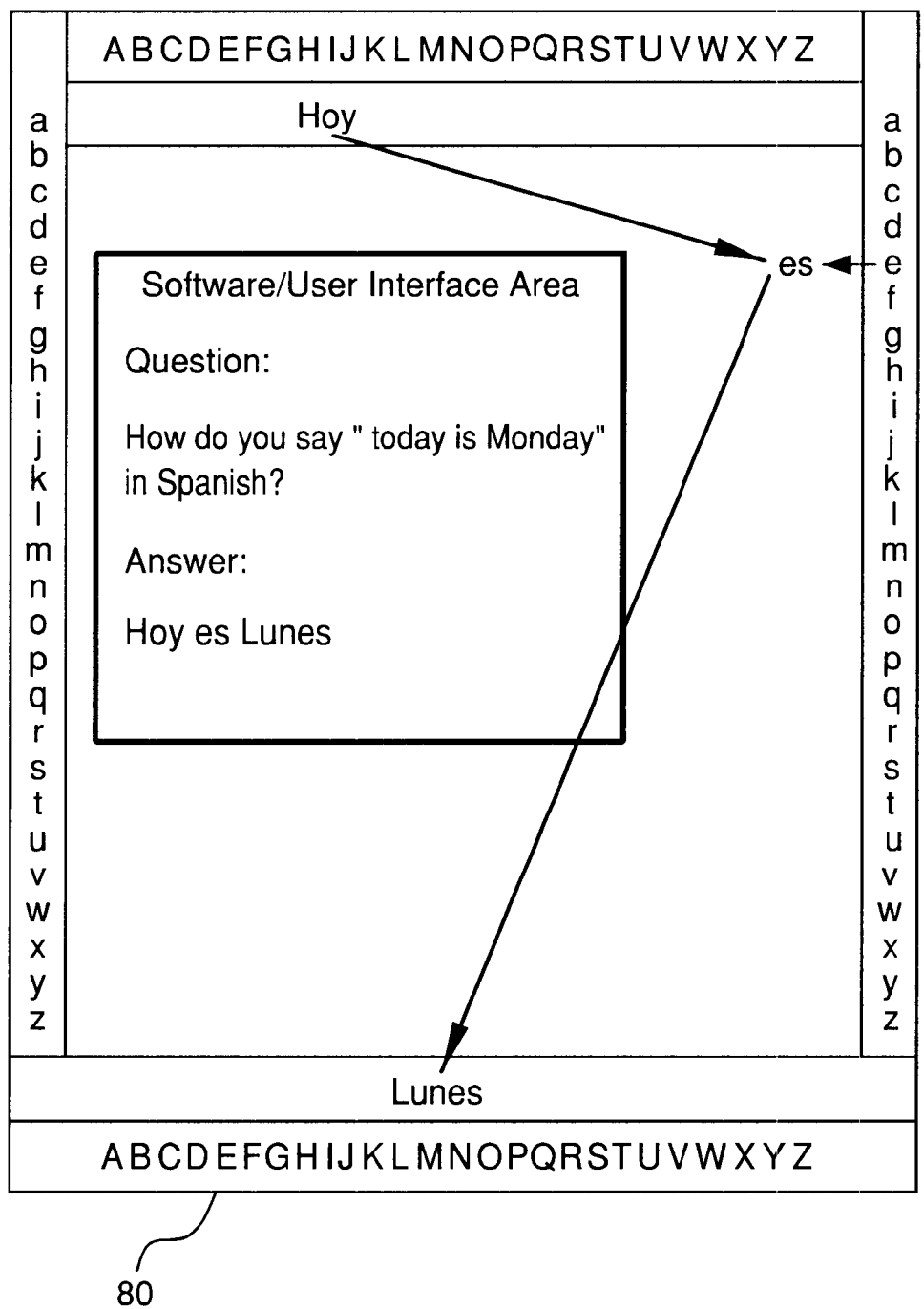
FIG. 8 illustrates another mnemonic display configured to handle keywords in Spanish.

FIG. 8 illustrates a mnemonic display 80 configured to handle keywords in Spanish. As mentioned above, the guiding elements of the border sections do not have to be in English, and they can vary depending on particular applications. In this case, the English alphabets can still be used for placing Spanish keywords in the grid learning system, and thus there is no need to change the guiding elements in the border sections.

Figure 9:
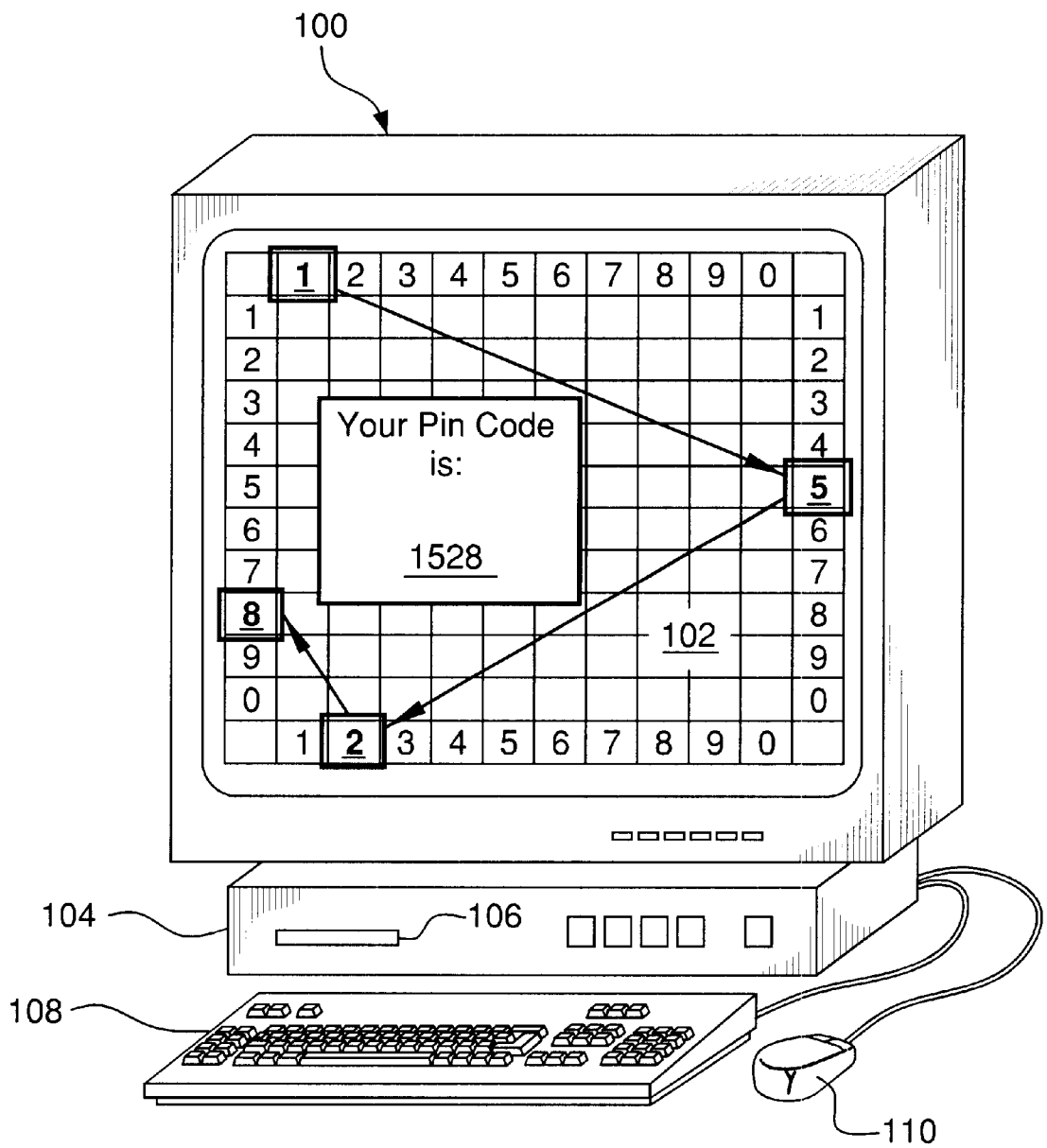
FIG. 9 illustrates a computer system for implementing one embodiment of the present invention.

Referring to FIG. 9, a computer system 100 includes a two-dimensional display device 102 and a computer housing unit 104. The computer housing unit 104 typically contains a motherboard (not shown). The motherboard contains a microprocessor (not shown) and is typically in communication with a storage media (not shown), such as a hard drive for storing programs and data. A disk drive 106 for loading programs may also be provided. A keyboard 108 having a plurality of keys and a pointing device, such as a mouse 110, is in communication with the motherboard. It will also be understood by those having skill in the art that one or more (including all) of the elements/steps of the present invention may be implemented using software executing on a general purpose computer processing system, using special purpose hardware-based computer processing systems, or using combinations of special purpose hardware and software.

In summary, the present invention provides a method and system for providing at least one grid learning system implemented on a display, and along with the display itself, to form a mnemonic display to serve as a guidance for enhancing a memorization process. Since display screens of various computing devices are predominantly the interfaces that a user acquires information from, using a mnemonic display resembling the shape of the display screens of various computing devices can easily establish the grid learning system in the mind of the user. With the grid learning system ingrained in the user's mind, the placements of keywords in the mnemonic display and its presented pattern can assist the user to remember or recall the keywords learned.

It is further noted that although the present invention is described above in the context of using alphabets and numerals as guiding elements to be filled on the border sections, they are only two examples. Depending on specific applications, guiding elements other than the alphabets and numerals can be used to form the grid learning system to make a display screen a mnemonic display for a particular user. The guiding elements are typically the smallest units that will compose a learning entity to be displayed on the mnemonic display. In the context of the alphabets and keywords, the alphabets are the guiding elements, and the syllables of the keywords are the learning entity. As an alternative, the entire keyword can be the learning entity. And if the entire keyword is viewed as a learning entity, the syllables are referred to and deemed as basic elements of the learning entity since they are logically dissected from the keyword and still contain more than one guiding element.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A method for enhancing a memorization process by using a mnemonic display implemented with a grid learning system, the method comprising:

implementing the grid learning system in a predetermined display area on a display device with a plurality of aligned border sections to form the mnemonic display, the border sections containing one or more guiding elements in a predetermined order;

identifying one or more learning entities to be memorized by a user of the mnemonic display; and placing the learning entities in the grid learning system, wherein a first guiding element contained in each learning entity is aligned with a same guiding element in one border section, and wherein locations of the learning entities with reference to the corresponding border sections assist the user to memorize the learning entities.

2. The method of claim 1 wherein the guiding elements are a plurality of alphabets.

3. The method of claim 1 wherein the guiding elements are a plurality of numerals.

4. The method of claim 1 wherein the learning entities are a plurality of syllables of a keyword to be memorized by the user.

5. The method of claim 1 wherein the learning entities are a plurality of keywords to be memorized by the user.

6. The method of claim 1 further comprising a grid guiding system superimposed on top of the grid learning system to help identify the location of each placed learning entity, the grid guiding system having a plurality of sections dividing the mnemonic display.

7. The method of claim 1 further comprising connecting the placed learning entities with tracking signs, wherein a pattern of the tracking signs further assists the user to memorize the learning entities.

8. The method of claim 1 wherein the step of identifying further includes identifying the learning entities in a user interface area within the mnemonic display.

9. The method of claim 8 wherein the user interface area is in a fixed location with a predetermined size.

10. The method of claim 8 wherein a location and a size of the user interface area is dynamically determined.

11. The method of claim 1 wherein the step of placing further includes implementing an indication sign aligning the first guiding element of at least one placed learning entity with the same guiding element in the at least one border section.

12. The method of claim 11 wherein the indication sign is a verbal signal.

13. A method for enhancing a memorization process by using a mnemonic display implemented with a grid learning system, the method comprising:

implementing the grid learning system on a display device with a plurality of aligned guiding rows, the guiding rows containing one or more guiding elements in a predetermined order;

identifying one or more learning entities to be memorized by a user of the mnemonic display; and placing one or more entities in the grid learning system, wherein a first guiding element of each learning entity is aligned with a same guiding element in at least one row, and wherein the locations of the learning entities with reference to the guiding elements of the guiding rows assist the user to memorize the learning entity.

14. The method of claim 13 wherein the guiding elements are alphabets.

15. The method of claim 13 wherein the guiding elements are numerals.

16. The method of claim 13 wherein the learning entity is a keyword.

17. The method of claim 13 wherein the learning entity is a syllable of a keyword.

18. The method of claim 13 further comprising a plurality of tracking signs connecting one learning entity to another.

19. A method for enhancing a memorization process by using a mnemonic display implemented with a grid learning system, the method comprising:

implementing the grid learning system on a display device with a plurality of aligned border sections, the border sections containing one or more guiding elements in a predetermined order, the number of the border sections being determined by the shape of the display device;

identifying one or more learning entities to be memorized by a user of the mnemonic display; and placing the learning entities in the grid learning system, wherein a first guiding element contained in each learning entity is aligned with a same guiding element in one border section, and wherein the shape of the display device and locations of the learning entities with reference to the corresponding border sections assist the user to memorize the learning entities wherein the learning entities are a plurality of syllables of a keyword to be memorized by the user.

20. The method of claim 19 further comprising connecting the placed learning entities with tracking signs, wherein a pattern of the tracking signs further assists the user to memorize the learning entities.

21. A method for enhancing a memorization process by using a mnemonic display implemented with a grid learning system, the method comprising:

implementing the grid learning system on a predetermined display area on a display device with a plurality of aligned border sections to form the mnemonic display, the border sections containing one or more alphabets in a predetermined order;

identifying at least one keyword to be memorized by a user of the mnemonic display; and placing one or more syllables of the keyword in the grid learning system, wherein a first alphabet of each syllable is aligned with a same alphabet in at least one border section, and wherein associating locations of the syllables with reference to the corresponding border sections assists the user to memorize the keyword.

22. The method of claim 21 further comprising indicating the keyword by connecting the placed syllables with tracking signs, wherein a pattern of the tracking signs on the mnemonic display further assists the user to memorize the keyword.

23. The method of claim 21 further comprising a grid guiding system superimposed on top of the grid learning system to help identifying the location of each placed syllable, the grid guiding system having a plurality of sections dividing the mnemonic display.

24. The method of claim 21 wherein the step of identifying further includes identifying the keyword in a user interface area within the mnemonic display.

25. The method of claim 24 wherein a location and a size of the user interface area are dynamically determined.

26. The method of claim 24 wherein a number of the border sections is determined based on the shape of the display device.

27. The method of claim 21 wherein the step of placing further includes implementing an indication sign aligning the first alphabet of at least one syllable of the keyword with the same alphabet in the at least one border section.

28. The method of claim 27 wherein the indication sign is a verbal signal.

29. A method for enhancing a memorization process by using a mnemonic display implemented with a grid learning system, the method comprising:

implementing the grid learning system in a predetermined display area on a display device with a plurality of aligned border sections to form the mnemonic display, the border sections containing one or more alphabets in a predetermined order;

identifying one or more keywords to be memorized by a user of the mnemonic display; and placing the one or more keywords in the grid learning system, wherein the first alphabet of each keyword is aligned with a same alphabet in at least one border section, and wherein locations of the keywords with reference to the corresponding border sections assist the user to memorize the one or more keywords.

30. A method for memorizing one or more learning entities by a user of a display device, the method comprising:

introducing, to the user, the learning entities initially by placing the learning entities in a mnemonic display, the mnemonic display being implemented on a predetermined display area on the display device and defined by a grid learning system with a plurality of border sections, each learning entity is aligned with at least one border section;

instructing the user to visualize the mnemonic display; and instructing the user to recall the learning entities by visualizing the locations of the placed learning entities in the mnemonic display guided by the grid learning system.

31. A method for enhancing a memorization process by using a mnemonic display implemented with a grid learning system, the method comprising:

implementing the grid learning system on a predetermined display area on a display device with a plurality of aligned border sections to form the mnemonic display, the border sections containing one or more numerical numbers in a predetermined order;

identifying a number sequence having one or more numbers to be memorized by a user of the mnemonic display; and placing each number of the number sequence in a close proximity to a selected border section in the grid learning system, wherein each number is aligned with a same number in at least one border section, and wherein associating locations of the numbers with reference to the corresponding border sections assists the user to memorize the number sequence.

32. The method of claim 31 further comprising connecting the placed numbers with tracking signs, wherein a pattern of the tracking signs on the mnemonic display further assists the user to memorize the number sequence.

* * * * *